United States Patent [19]

Gouronnec et al.

[11] 4,373,943

[45] Feb. 15, 1983

[54] MULTIPLE FIBER FORMING MACHINE

[76] Inventors: Alain Gouronnec, Krec'h Lia Beg Leguer, Servel, 22300 Lannion; André Regreny, Parc ar Croas 17, rue Albert Camus, 22700 Perros Guirec; Michel Treheux, An Tri Breud, rue des Iles L'Ile Grande, 22560 Pleumeur-Bodou, all of France

[21] Appl. No.: 224,527

[22] PCT Filed: Mar. 26, 1980

[86] PCT No.: PCT/FR80/00046
§ 371 Date: Nov. 29, 1980
§ 102(e) Date: Nov. 19, 1980

[87] PCT Pub. No.: WO80/02139
PCT Pub. Date: Oct. 16, 1980

[30] Foreign Application Priority Data

Mar. 23, 1979 [FR] France .................................. 79 07926

[51] Int. Cl.³ ........................................... C03B 37/025
[52] U.S. Cl. ..................................... 65/10.1; 65/11.1; 65/13; 118/672; 118/674; 156/167; 156/180; 156/441
[58] Field of Search ................. 65/10.1, 13, 3.11, 3.4, 65/4.2, 11.1, 163; 118/672, 674; 156/360, 362, 441, 167, 180

[56] References Cited

U.S. PATENT DOCUMENTS

| 2,929,738 | 3/1960 | Bateson et al. | 427/375 |
| 3,014,453 | 12/1961 | Bateson et al. | 118/58 |
| 3,301,932 | 1/1967 | Chisholm | 264/174 |
| 4,204,852 | 5/1980 | Watts et al. | 65/13 X |

FOREIGN PATENT DOCUMENTS

| 2655996 | 6/1977 | Fed. Rep. of Germany . |
| 1316554 | 12/1962 | France . |
| 1587836 | 3/1970 | France . |
| 2040220 | 1/1971 | France . |
| 2312788 | 12/1976 | France.. |
| 2368677 | 5/1978 | France . |

Primary Examiner—Richard V. Fisher

[57] ABSTRACT

A multiple fiber formation machine permits a simultaneous drawing of a plurality of N optical fibers and then a linear multifiber stranding. It comprises a first drawing assembly for a plurality of N fibers constituted by N regulatable preformed supports, a system of N fiber formation enclosures, a system for the simultaneous coating of N fibers, a plurality of N drawing or pulley capstans, and a fiber diameter measuring system. A second linear multifiber stranding assembly comprises a cable support supply system, positioning means for the N fibers from the first drawing assembly, a system of coating the support with its fibers and a cable reception drum.

6 Claims, 8 Drawing Figures

MULTIPLE FIBER FORMING MACHINE

BACKGROUND OF THE INVENTION

The present invention relates to a multiple fibre forming machine permitting a simultaneous drawing of a plurality of optical fibres and then a linear multifibre stranding. It is used in the construction of cables intended for optical telecommunications.

Two stages are involved in the production of a multifibre cable. Firstly, an optical fibre is drawn and stored temporarily on reels or drums and then the stranding operation is performed with the same number of storage reels or drums as there are to be fibres in the cables.

More specifically, in a conventional optical fibre drawing installation, a preform made from a suitable material (e.g. silica) is formed into fibres at a speed of approximately 30 m/minute. The fibre obtained is then coated with a covering product and stored on a drum.

Every effort is made to store the maximum fibre lengths so as to be to appropriately supply the stranding machine. However, the obtaining of very great fibre lengths would appear to be not easily compatible with the presently available drawing processes, so that in practice splicing operations are necessary to obtain great lengths.

Moreover, a stranding machine generally comprises an extruder, which supplies a cable support having recesses which are able to receive the fibres, an assembly and connecting means which appropriately places the fibres in the recesses and finally a means for covering the cable with a protective sheath. The cable is produced at a speed of approximately a few meters per minute.

The operating procedure according to the prior art has a number of disadvantages. It involves a number of stages and raises the problem of the compatibility of the fibre formation and stranding speeds. In order to make the best possible use of the assembly and connecting means of the stranding machine, it is necessary to have a plurality of drawing machines upstream of the stranding machine, so that costs are high and the installation is of a complex nature.

This difficulty is a handicap for optical fibres in competition with conventional electrical cables. The situation is in fact much more favourable for the latter because the basic wire can be produced at speeds of approximately 1,200 to 1,600 m/minute over very considerable length (50 to 100 km) and only a single drawing machine is required for supplying the stranding installation.

BRIEF SUMMARY OF THE INVENTION

The invention relates to a machine which obviates this disadvantage. Thus, it provides means for the simultaneous drawing of a plurality of optical fibres in such a way that a linear stranding is then possible, all the drawing and stranding operations taking place in a continuous manner. In this way, the intermediate storage of individual fibres is obviated, the necessity of having very considerable fibre lengths no longer occurs and the different parts of the installation acquire speed compatibility. Thus, the machine according to the invention leads to optical cable manufacturing speeds which are close to those of conventional cables, which increases the commercial interest in the optical fibres.

More specifically, the invention relates to a multiple fibre forming machine permitting a simultaneous drawing of a plurality of N optical fibres and then a linear multifibre stranding, wherein it successively comprises:

(A) a first drawing assembly for a plurality of N fibres, said first assembly being constituted by:
  (a) N regulatable preformed supports associated with controlled speed lowering means;
  (b) an assembly of N high temperature drawing enclosures, each receiving a preform and supplying a fibre;
  (c) a system for the simultaneous coating of N fibres constituted by N opening spinnerets or extrusion dyes supplied by a coating product and traversed by the fibres;
  (d) a plurality of N pulling capstans, each receiving a fibre and being controlled in rotation by an appropriate means; and
  (e) a system for measuring the diameter of the fibres controlling the fibre formation speed of said first assembly; and (B) a second linear multifibre stranding assembly constituted by:
  (f) a cable support supply system incorporating recesses for receiving at least one fibre;
  (g) means for positioning the N fibres from the first drawing assembly in the recesses of the support;
  (h) a system for coating the support with its fibres, said system supplying the cable; and
  (i) a cable reception drum.

The preform support system used in the first assembly of the machine according to the invention may comprise a single control means for lowering the preforms into the fibre forming furnace or oven. The lowering speed is then regulated as a function of the average diameter of the group of preforms used. This presupposes a prior sorting of the preforms, so that at the same time only preforms having similar geometrical characteristics are formed into fibres.

However, it obviously falls within the scope of the invention to use means for independently regulating therefore with respect to one another the speeds at which the preforms are introduced into the drawing furnace. Each speed is then determined on the basis of a measurement of the diameter of the corresponding fibre. These speeds can be regulated in such a way that the fibre formation speed is constant, making it possible to simplify the rotation control of the capstans.

In this variant involving an individual control, the lowering of the preforms can be controlled by a microprocessor, which receives the different fibre diameter measuring signals and supplies two control signals, namely an overall signal determining an average lowering speed for the group of preforms and a differential signal which adjusts, for each preform, and in accordance with the diameter of the corresponding fibre, the speed variation compared with the average speed.

The system of N high temperature drawing enclosures can be constituted by N independent furnaces of a random nature (resistive furnaces, induction furnaces or furnaces with torches). However, preferably it is constituted by a single induction furnace having N drawing laboratories constituted by N bores made in a heating element surrounded by an induction coil.

This furnace may have an axial symmetry, but can also have linearly arranged laboratories, said variant having the advantage of supplying fibres located in the same plane, which will then be tangential to the drawing or pulling capstans. In the first variant with axial symmetry, return means are necessary for transforming the bunch of cylindrical fibres into a planar bunch.

A type of furnace which can be used in the present invention is described in French Patent Publication No. 2368677, published May 19, 1978 and entitled "Furnace for very high temperatures".

The machine according to the invention makes it possible to produce optical cables of any known type (tight band, slack honeycombed band or cylindrical honeycombed structure, etc). However, according to a special embodiment, the cable support is constituted by a cylindrical core peripherally provided with helical grooves having an alternating pitch in which are placed the fibres in a tensionless, free manner.

In connection with this special cable structure and the corresponding stranding machine, reference can be made to French Patent Publication No. 23 12788, published Dec. 24, 1976 and entitled "Elementary transmission cable by optical fibres".

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
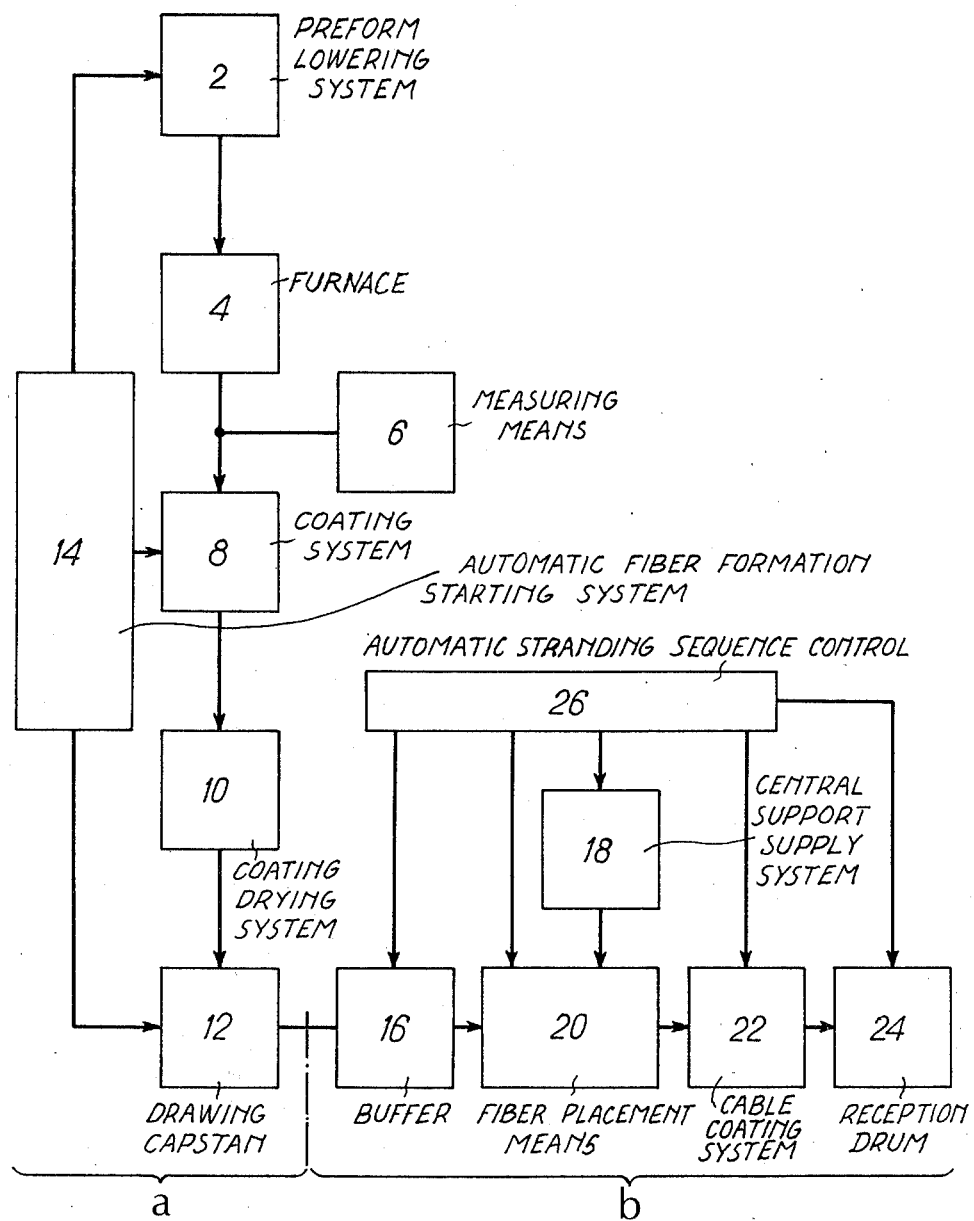
FIG. 1 the block diagram of the machine according to the invention.

FIG. 1 is a block diagram showing the general construction of the machine according to the invention. This machine is essentially in two parts, namely a part a which constitutes an assembly for drawing a plurality of fibres and a part b which constitutes a linear multifibre stranding assembly.

Part a comprises a preform lowering system 2, a furnace 4 which permits multiple fibre formation, means 6 for measuring the diameter of the fibres supplied by the furnace, a system 8 for coating the fibres followed by a means 10 for drying said coating, a multiple pulling or drawing capstan 12 and a system 14 for the automatic starting of fibre formation.

Part b comprises a buffer 16, a central support supply system 18, means 20 for placing the fibres in position on the central support, a cable coating system 22 and a reception drum 24. The assembly is completed by a system 26 for the automatic control of the stranding sequence.

Figure 2A:
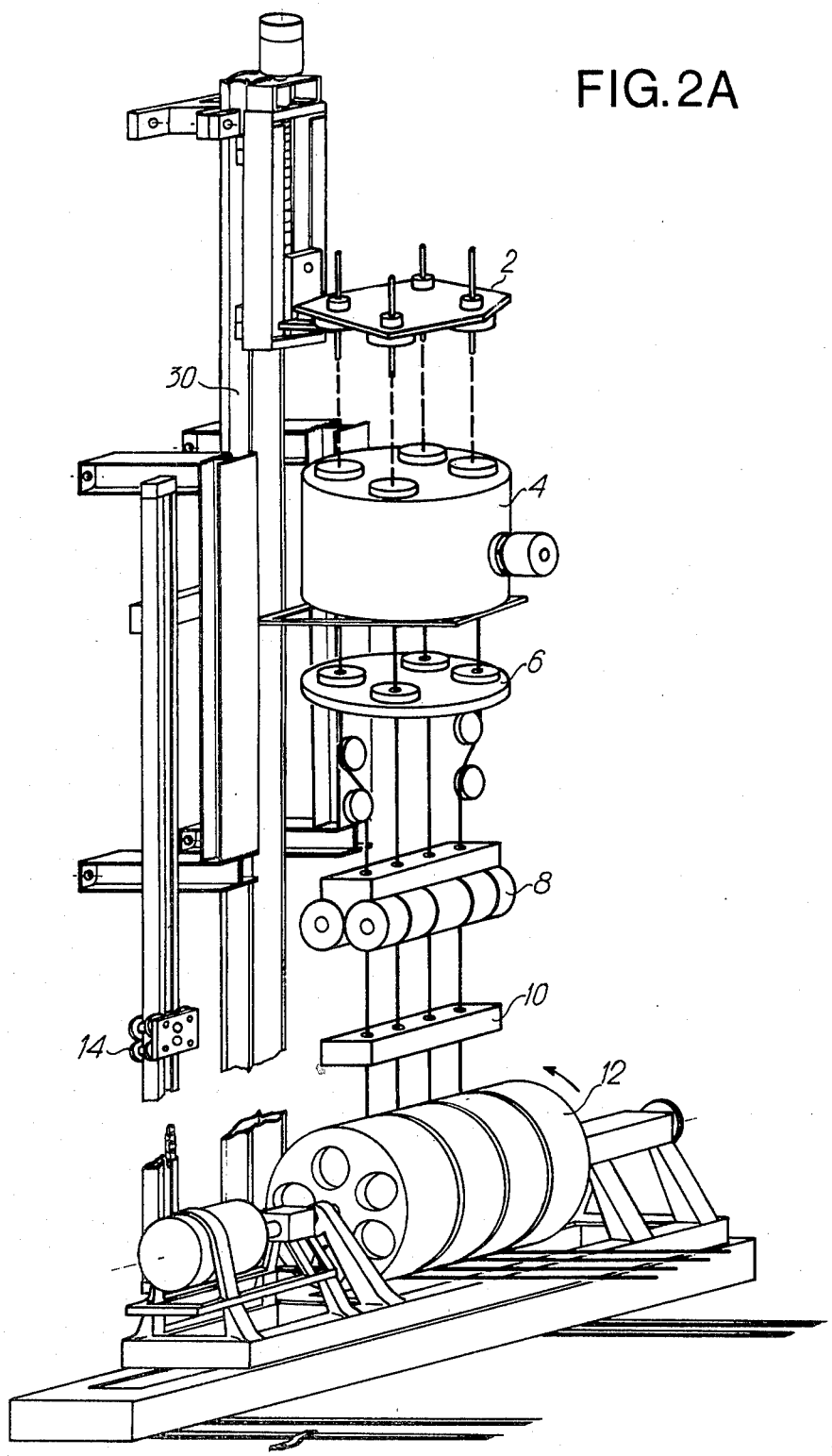
FIG. 2a a perspective view of a drawing assembly according to the invention.
Figure 2B:
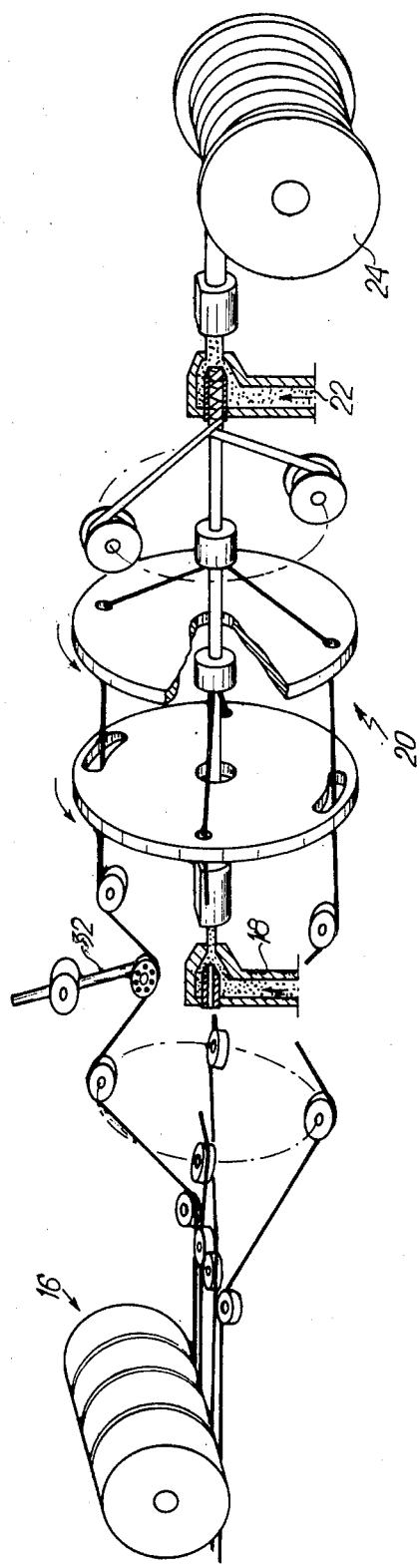
FIG. 2b a perspective view of a multifibre stranding assembly.

The different means listed hereinbefore are shown in a more detailed manner in FIGS. 2a and 2b in the specific, non-limitative case where an axial symmetry induction furnace is used and where there are four fibres. This number is kept relatively small for the reason of the clarity of the drawings. However, in practice, there can be 10 or more fibres.

In FIGS. 2a and 2b, the members shown in block form in FIG. 1 are given the same reference numerals for simplification purposes. FIG. 2a also shows a vertical rail 30 which supports the different parts of the drawing assembly, whilst FIG. 2b shows control members 32 on each of the fibres (one only being shown for simplification reasons).

Certain of these means have already been described in the aforementioned French Patent publications and for this reason will not be described again. With regard to the stranding assembly, this more particularly refers to the device 6 for measuring the diameter of a fibre and the automatic starting device 14, both of which are described in French Patent Publication No. 2 383 138 published Oct. 6, 1978 and entitled "Equipment for drawing optical fibres from a preform, improved with respect to the regulation of the speed of the drawing drum and the automatic starting of fibre formation".

With regard to the automatic starting system, it must be adapted to multiple fibre formation and must permit the following operations:

the control of the various parameters (particularly the temperature of the laboratories of the furnaces);

lowering of the preforms into the furnace;

the action of prestretching the beginning of the fibres;

lowering the prestretching system along the machine up to the point of pulling the fibres on the pulling capstans;

return of the beginnings of the fibres to an intermediate storage system enabling the operator to start the successive stranding of the individual fibres; and acquisition of data and the supply of information regarding the manufacturing characteristics of the fibres.

In order to give the operator sufficient time, to the bottom of each preform is welded an ordinary silica bar which is stretched throughout the time necessary for obtaining the state of equilibrium of the system. This may call for a silica wire length of a few hundred meters. As from said state of equilibrium and with all the bottoms of the preforms in the same plane, the actual operation can start as soon as the bar—preform welding point has been spun.

The furnace having a plurality of laboratories has been described in the aforementioned French patent publication No. 23 68677.

The stranding assembly means and in particular the extruder 18, the packing or lining means of device 20 and the extrusion machine 22 are described in the aforementioned French Patent Publication No. 2,312,788.

Figure 3A:
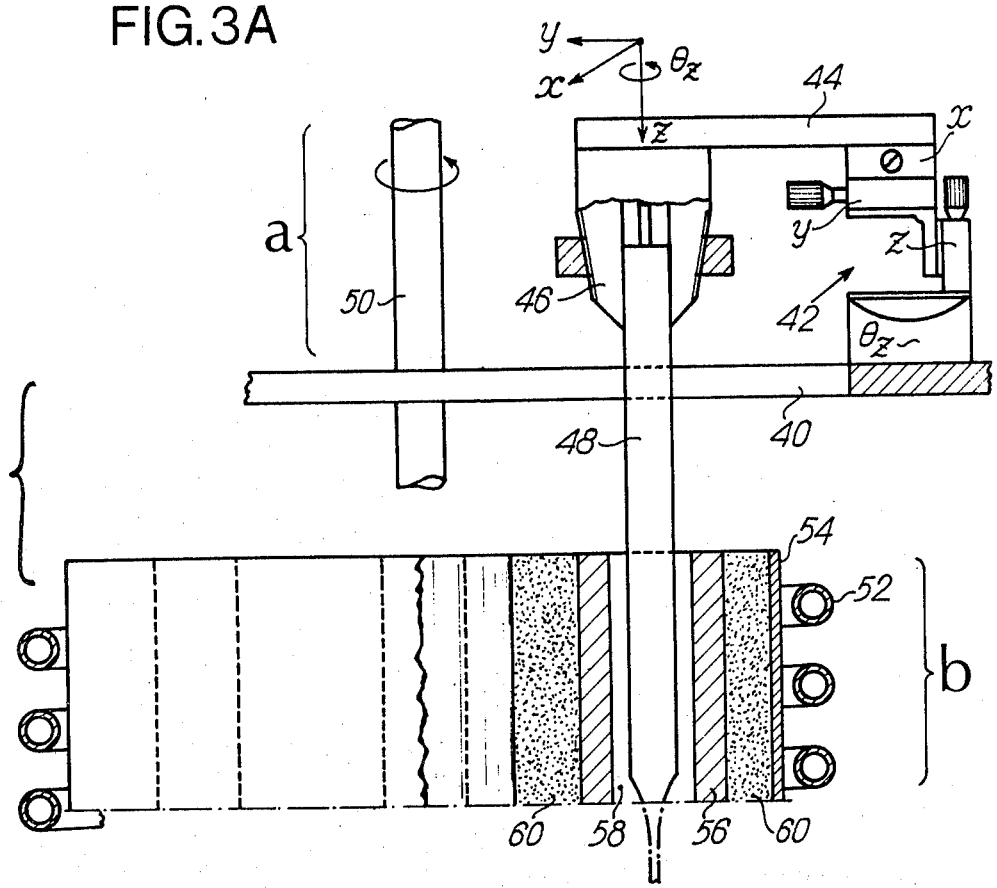
FIG. 3A a special embodiment of a preform support and an induction furnace in axial section, and FIG. 3B the furnace in cross-section.
Figure 3B:
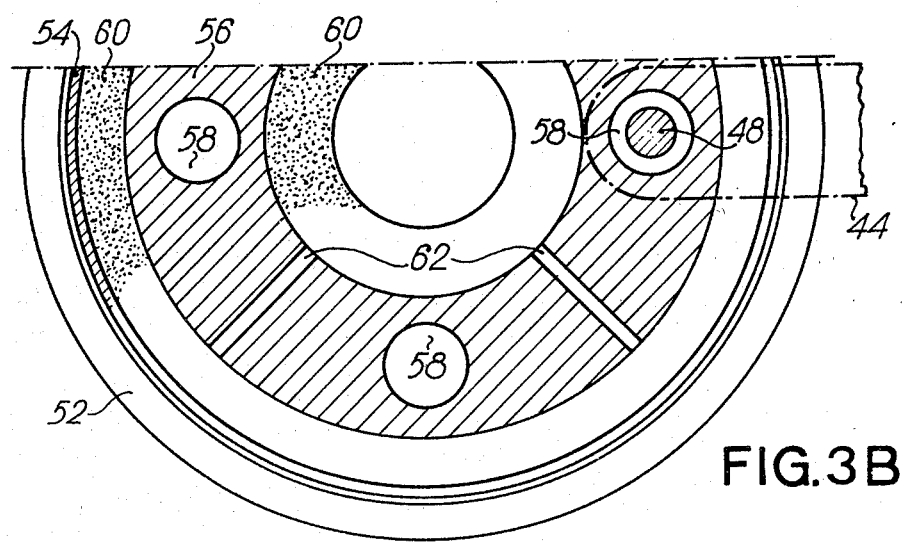

FIGS. 3A and 3B show a special embodiment of the preform support and the associated furnace with part a of FIG. 3A more specifically showing the support of the preforms, part b of FIG. 3A the furnace longitudinal section. FIG. 3B shows the furnace in cross-section.

The support shown in part a comprises a plate 40 supporting a device 42 for regulating in three directions x, y, z and by an angle $\theta_z$ as well, an arm 44 at the end of which is positioned a support 46 for preform 48. Plate 40 is integral with a shaft 50, which can be controlled in rotation by not shown means.

The furnace shown in section in part b comprises a field coil 52 which surrounds an insulating tube 54, e.g. of silica, within which is provided a heating element 56, e.g. of graphite, containing bores 58 which form the same number of drawing laboratories. Body 56 is insulated from the external tube 54 by a material 60, e.g., of graphite wool.

The section of FIG. 3B shows the slots 62 made in heating element 56 and intended to prevent the flow of eddy currents.

The regulation in directions x and y of support 42 makes it possible to place each preform in the centre of the fibre formation laboratory allocated to it in the furnace. The regulation in direction z makes it possible to place the bottom of all the preforms in the same horizontal plane. The regulation by angle $\theta_z$ makes it possible to align each preform with the axis of its fibre formation laboratory.

The preforms can be lowered into the furnace by a ball screw connected to plant 40 and controlled by an electronic circuit with a bidirectional control acting on a geared motor. Thus, the lowering speed is uniform, regulated and identical for all the preforms. It is possible, for example, to use a direct current, flat rotor motor.

The preform lowering speed $V_p$ is regulated in such a way that the volume of material entering the furnace is equal to the volume of material leaving the furnace in the form of fibres. If $V_f$ designates the fibre formation speed, $d_p$ the diameter preform and $d_f$ of the diameter of a fibre, the fibre formation equation under steady state conditions expressing this uniformity of volume is, in the case of one fibre:

$$V_p d_p^2 = V_f d_f^2.$$

The measurement of the diameter $d_f$ makes it possible at any time to regulate the preform lowering speed $V_p$ or conversely the fibre formation speed $V_f$ or both of them.

The dimensions of the furnace shown in FIGS. 3A and 3B are dependent on a number of parameters:
  the operating frequency of the generator used;
  the generator power;
  the design of the preform positioning system;
  the space or position necessary for the coating system; and
  the space or position necessary for the system making it possible to bring into one plane all the fibres leaving the furnace, etc.

For example, it is possible to use an induction furnace having a graphite heating element of diameter 100 mm, of total height 80 mm and with an active height of 30 mm. The frequency can be between 10 and 50 kHz.

Figure 4:
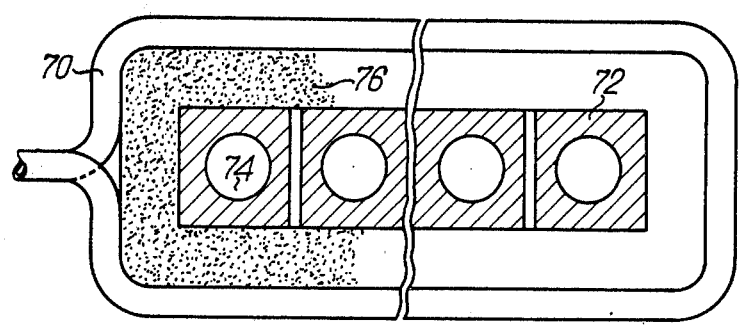
FIG. 4 diagrammatically, another embodiment of an induction furnace which can be used in the invention.

However, it is also possible to use other types of furnace, whose geometry leads to fibres which, as from their formation, are located in a vertical plane tangential to the pulling capstans. A linear furnace, like that shown in FIG. 4 may well be suitable. The furnace shown essentially comprises an inductor 70, a heating element 72 in the form of a parallelepiped and perforated by bores 74, whose axes are all in the same plane, whilst an insulating material 76 is inserted between the inductor and the heating element.

With regard to the fibre coating system, it is possible to see N independent spinnerets, each associated with one fibre. However, according to an advantageous variant, a device like that shown in FIG. 5 is used and this makes it possible to simultaneously coat all the fibres coming from the furnace.

Figure 5:
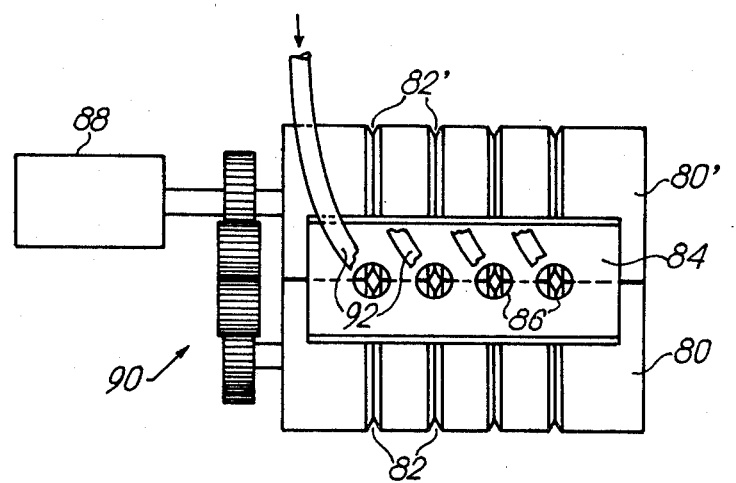
FIG. 5 a special means for the simultaneous coating of several fibres.

The coating means shown in FIG. 5 comprises two rollers 80 and 80', provided wth four grooves 82 (82') and surmounted by a wedge 84 having four channels 86. The two rollers 80, 80' are rotated by a motor 88 and their rotation directions are opposite to one another as a result of a set of gear wheels 90. Not shown means make it possible to move aside the rollers and bring them into a tangential position. Tubes 92 supply each channel 86 with a fibre coating product.

This device functions in the following manner. The grooves of the roller form four opening spinnerets located beneath the channels 86. Each fibre passes from top to bottom through a spinneret and the rotation direction of the rollers is such that the grooves perform a bottom to top movement relative to the spinneret. The coating product fills the channels 86, as well as the spinnerets and over a significant height wets the fibres traversing them.

Figure 6:
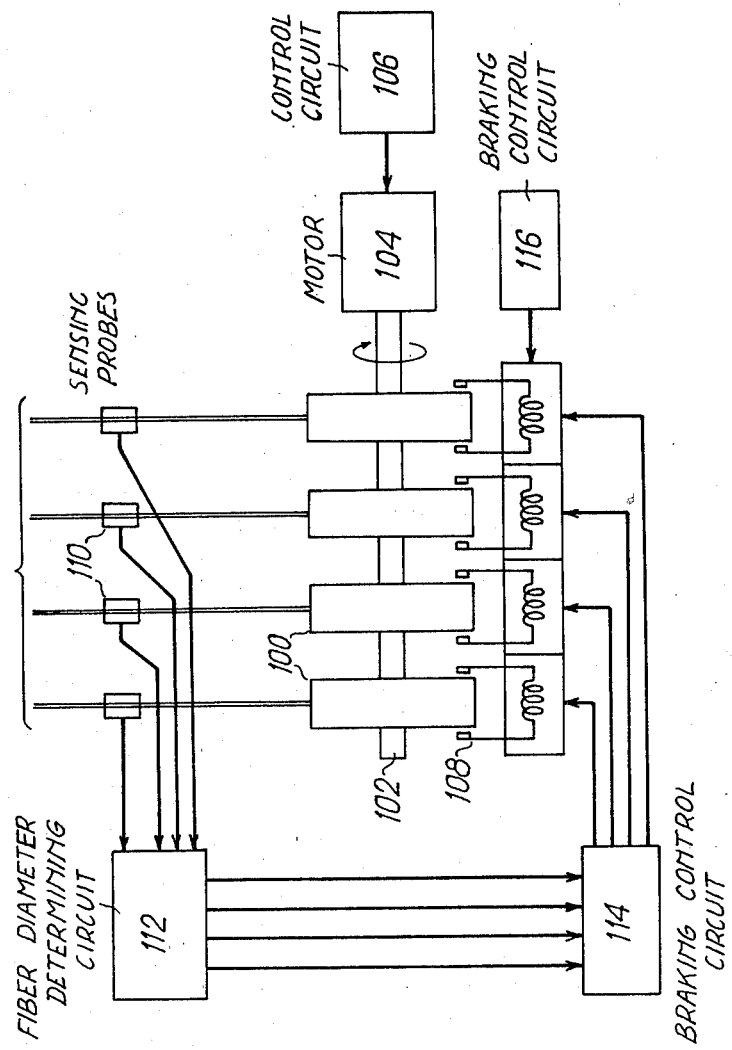
FIG. 6 diagrammatically, the pulling or drawing capstan control means.

Finally, FIG. 6 shows a special embodiment of the means permitting the regulation of the pulling capstan speeds. The means shown comprise pulleys 100 mounted on a driving shaft 102 rotated by a geared motor 104 controlled by an electronic circuit 106. The pulleys are connected to the driving shaft by a variable connection, e.g. of the friction type. An electromagnetic brake 108 is associated with each pulley. Sensing probes 110 are positioned around each fibre and supply measuring signals to a circuit 112 which determines the diameter of each fibre. In turn, this circuit supplies voltages, which are a function of these diameters and a circuit 114 produces signals for controlling the braking of the pulleys. This assembly is completed by a general braking control circuit 116.

The driving speed of shaft 102 is such that without braking, the linear speed of the fibre exceeds the desired value by a quantity $\Delta V$. In order to obtain the correct fibre formation speed for one fibre, the electromagnetic brake associated with the pulling capstan for said fibre is actuated in such a way that the linear speed of the pulley is reduced by quantity $\Delta V$. The tolerance $\Delta V$ must be made sufficiently large so that, if necessary, by reducing the braking it is possible to increase the fibre formation speed up to a useful value.

In this way, if a sensing probe 110 and circuit 112 detect a reduction in the diameter of a fibre, the signal produced by circuit 114 is such that the action of the brake on the pulley corresponding to this fibre is increased, which has the effect of reducing the pulling speed and correlatively increasing the fibre diameter. Conversely, if the sensing probe and measuring circuit detect an increase in the diameter of a fibre, the action of the brake is reduced, the pulling speed increases and the fibre diameter again receives its correct value.

What is claimed is:

1. A multiple fibre forming machine permitting a simultaneous drawing of a plurality of N optical fibres and then a linear multifibre stranding, wherein it successively comprises:
  (A) a first drawing assembly for a plurality of N fibres, said first assembly being constituted by:
    (a) N regulatable preform supports associated with controlled speed lowering means;
    (b) an assembly of N high temperature drawing enclosures, each receiving a preform and supplying a fibre;
    (c) a system for the simultaneous coating of N fibres constituted by N opening spinnerets or extrusion dyes supplied by a coating product and traversed by the fibres;

(d) a plurality of N pulling capstans, each receiving a fibre and being controlled in rotation by an appropriate means; and (e) a system for measuring the diameter of the fibres controlling the fibre formation speed of said first assembly; and (B) a second linear multifibre stranding assembly constituted by:

(f) a cable support supply system incorporating recesses for receiving at least one fibre;

(g) means for positioning the N fibres from the first drawing assembly in the recesses of the support;

(h) a system for coating the support with its fibres, said system supplying the cable; and (i) a cable reception drum.

2. A machine according to claim 1, wherein the assembly of N drawing enclosures is constituted by an induction furnace having N laboratories constituted by N bores made in a heating element surrounded by an induction coil.

3. A machine according to claims 1 or 2, wherein the coating system is constituted by two drums, each having N grooves, whereby the grooves of one drum face the grooves of the other drum, said drums being rotated in opposite directions, the displacement direction of the walls of the spinneret being the opposite to the displacement direction of the fibre in the spinneret.

4. A machine according to claim 3, wherein a wedge having N channels is positioned above the drums, each channel receiving a coating product by means of a tube and in each case coats one fibre.

5. A machine according to claim 1, wherein the pulling or drawing capstans are constituted by pulleys mounted by a friction connection on a rotated shaft, each pulley being provided with a regulatable brake controlled by an appropriate means on the basis of the result of the measurement of the diameter of the fibre wound onto the pulley.

6. A machine according to claim 1, wherein the cable support is constituted by a cylindrical core peripherally perforated by helical grooves with an alternating pitch in which are placed the fibres, a sheath being placed around the core.

* * * * *